2,263,794

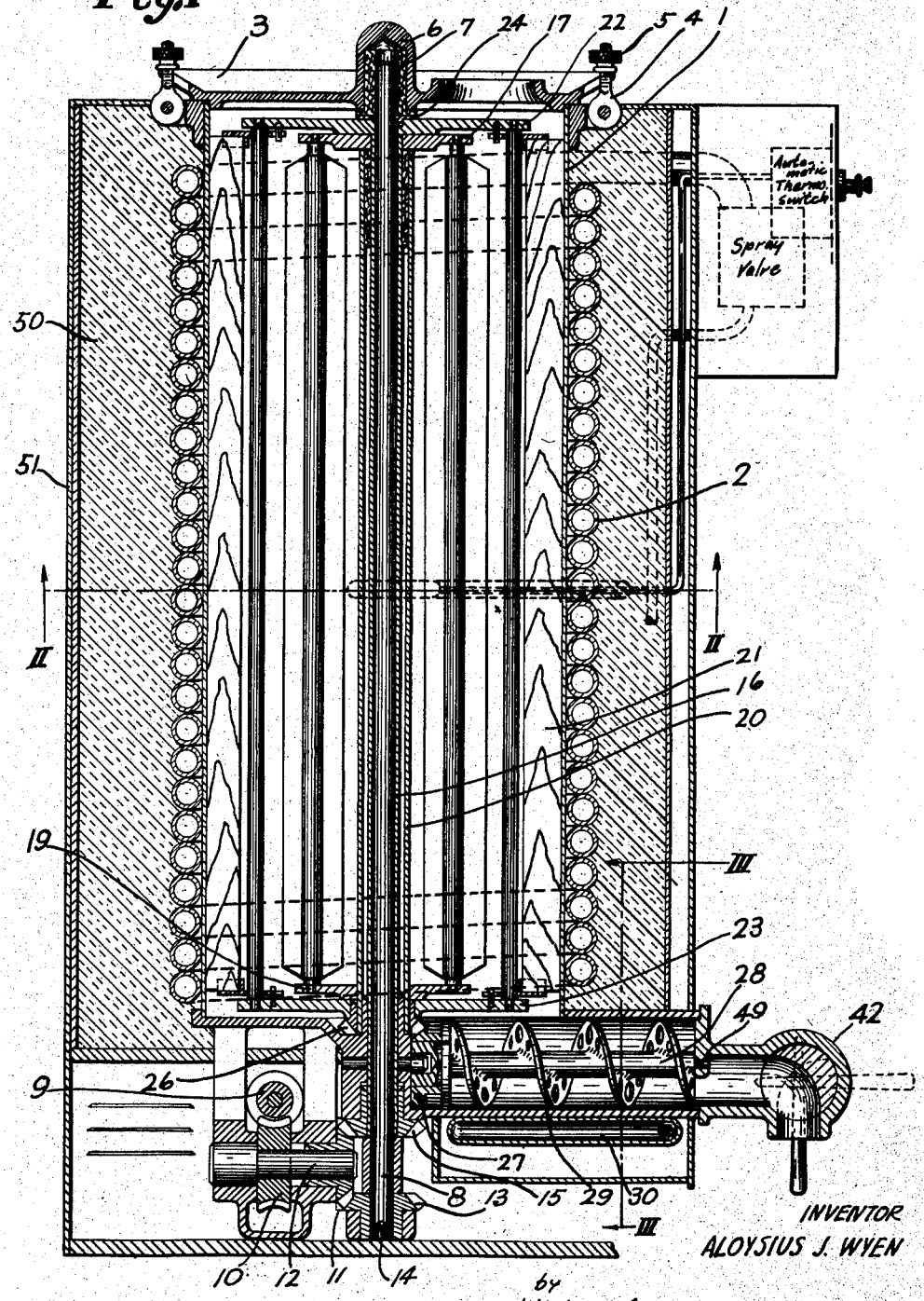

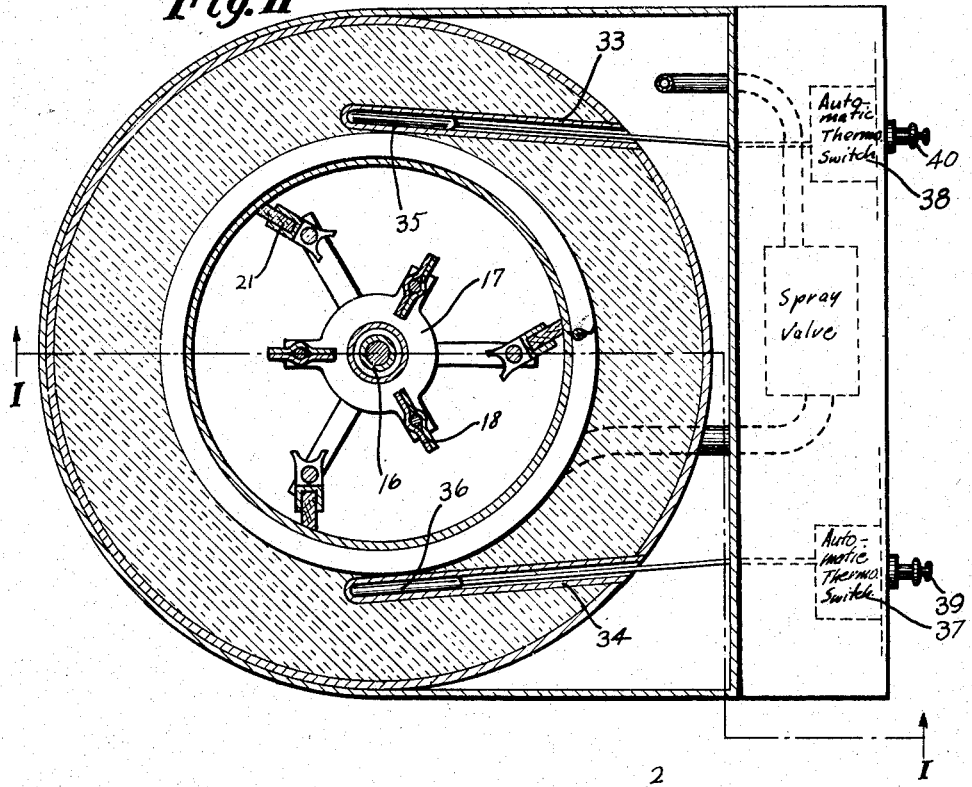
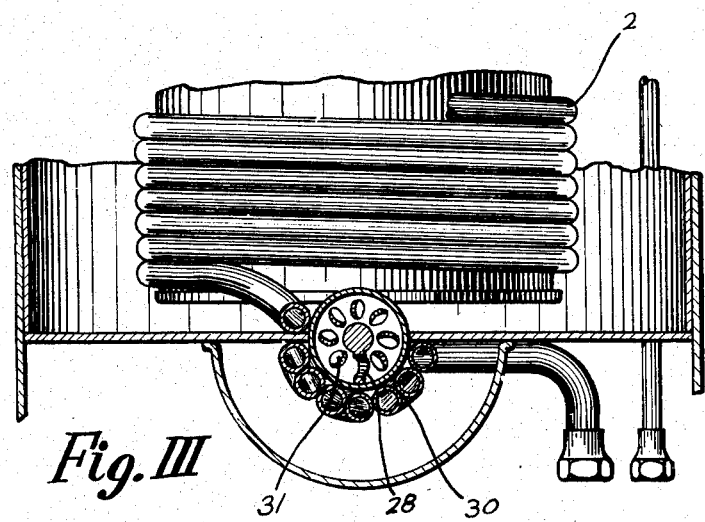

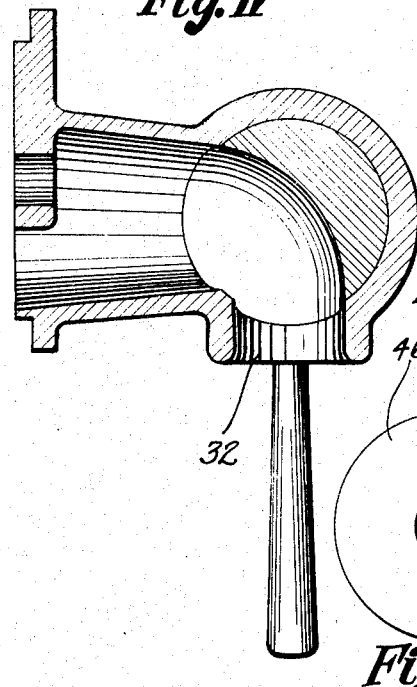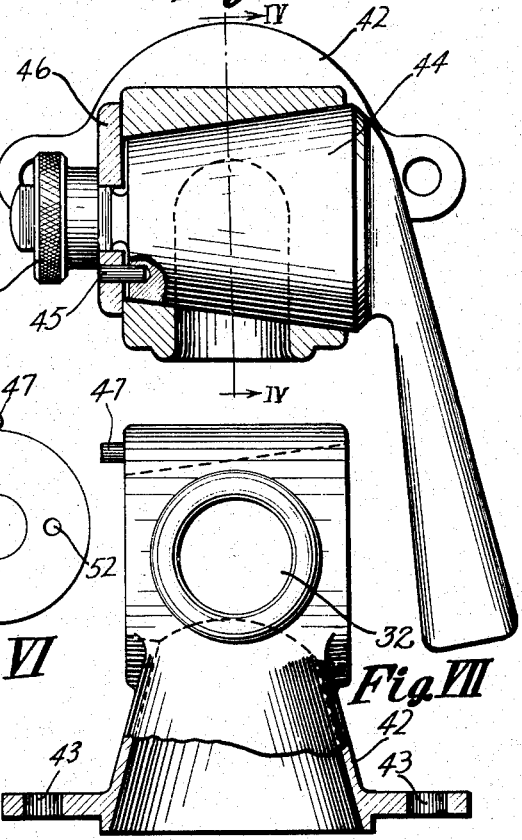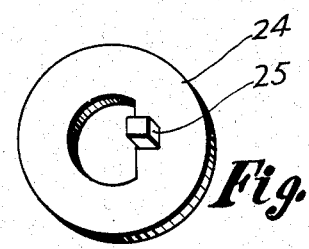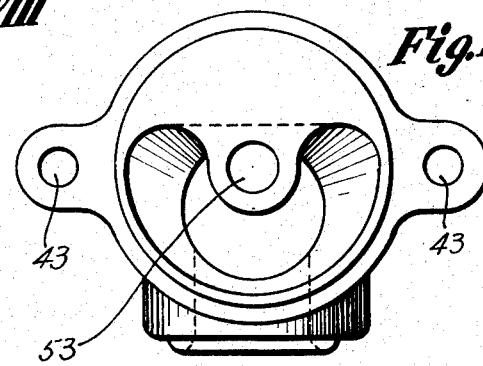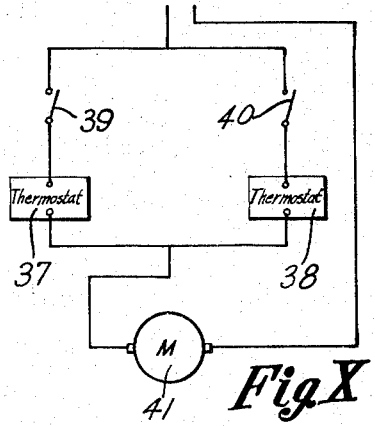
INVENTOR
ALOYSIUS J. WYEN
by Herbert S. Nonneman ATTORNEY Patented Nov. 25, 1941

UNITED STATES PATENT OFFICE 2,263,794

APPARATUS FOR FREEZING AND DISPENSING FOOD PRODUCTS

Aloysius J. Wyen, Montgomery County, Ohio

Application June 16, 1939, Serial No. 279,515

4 Claims. (Cl. 62—114)

This invention relates to a machine for the continuous cooling and freezing of liquids, particularly as related to the preparation and dispensing of emulsions such as malted milk and other frozen food products. In the following description the product to be frozen and then dispensed will be referred to as a mix or emulsion.

It is an object of this invention to provide a device which can be used as a mechanical freezer so constructed that the mix when frozen can be retained in said freezer and continuously cooled to such a temperature that the product or mix can be discharged into a glass or other container for immediate consumption.

I have discovered further that in order to obtain most efficient results in a device of this nature it is necessary to provide means for constantly keeping the mix in motion near the point where said mix is withdrawn so that the texture is always such that the product can be readily discharged.

Emulsions commonly known as thick malted milk which is ordinarily mixed in small quantities from products usually already frozen, can be frozen and kept in large quantities in this device and dispensed as demanded.

With these and incidental objects in view, the invention consists of certain novel features of construction and combination of parts, the essential elements of which are set forth in the appended claims and a preferred form or embodiment of which is hereafter described with reference to the drawings which accompany and form a part of this specification.

Of said drawings:

Fig. I is a sectional view of the apparatus taken approximately on the line I—I of Fig. II.

Fig. II is a sectional view of Fig. I taken approximately on the line II—II of Fig. I.

Fig. III is a fragmentary section of the bottom of the apparatus taken approximately along the line III—III of Fig. I.

Fig. IV is a sectional view of the dispensing valve taken approximately along the line IV—IV of Fig. V.

Fig. V is an assembly view of the dispensing valve with portions of the valve housing and moveable member cut away to better show construction.

Fig. VI is a view of the washer member of the dispensing valve showing the stops controlling the open and closed position of the valve.

Fig. VII is a view of the valve housing showing the opening through which the emulsion is dispensed.

Fig. VIII is an enlarged view of a key washer which is used to drive the outer set of paddles in the freezer cylinder.

Fig. IX is a rear view of the valve housing.

Fig. X is a wiring diagram of the electrical wiring of said device.

General description

The preparation of emulsions, particularly that known as malted milk, in large quantities has distinct advantages in the business of dispensing such products.

In order to provide such a device I have provided a freezer consisting of a freezing cylinder cooled by contact with the cooling coils of a mechanical refrigerator. Said cylinder is in turn surrounded by an insulating material.

Thru the lid at the top of the cylinder the mix is introduced into the cylinder.

A series of paddles moving in opposite directions whip said mix which is also cooled by contact with the inner surface of said cylinder. The outer set of paddles scrape off the mix from the surface of the cylinder.

By an arrangement of thermostats said mix is frozen and then brought to the required temperature necessary for the satisfactory dispensing of the emulsion.

This is accomplished by means of two thermostats. One thermostat is set at a predetermined temperature necessary for the freezing operation.

After the mix is properly frozen, said thermostat is made inoperative by being disconnected from the circuit whereupon another thermostat functions to keep the emulsion at the proper temperature for dispensing of the product.

One of the important parts of my invention consists in the worm shaped element mounted in the cylinder at the bottom of the device. This worm is usually in motion and propels the emulsion from the dispenser when the valve is in the open position. The cylinder in which the worm shaped element turns is also cooled.

When said valve is closed the worm shaped element continues to turn, keeping the emulsion from getting too thick. To keep the device from jamming, holes and slots are cut into the face of the worm shaped element hence allowing the emulsion to move back through the worm. However, when the valve is opened there is enough surface on the face of the worm so that said worm tends to force the emulsion through the opening in the valve.

Referring to the valve or opening at the end of the dispensing cylinder, the emulsion, which is usually quite thick, is stopped from flowing through said valve due to the change in the position of the opening cut in the movable part of said valve. The positive action of said valve is quite important when dispensing an emulsion such as thick malted milk.

A detailed description of one form of the device to accomplish the above mentioned objects and functions follows:

*Detail description*

A cylinder 1 (Fig. I) is provided surrounded by cooling coils 2 which are wound around said cylinder. A lid 3 is placed on said cylinder which is securely clamped down by means of toggle bolts 4 and knurled nuts 5, two of which are provided.

A portion of lid 3 constitutes a bearing housing 6, in which a fiber bearing 7 is inserted. Drive shaft 8 rotates in bearing 7.

The entire device is propelled by means of an electric motor connected to a gear train, said motor not being shown in said drawings.

Worm gear 9 propels gear 10 which is attached to shaft 12. Shaft 12 propels gear 11 which in turn propels gear 13 which is keyed to shaft 8 by means of key 14 which is inserted in gear 13 and in turn being located in a slot provided at the end of shaft 8. Gear 15 is also propelled by gear 11.

Attached to gear 15 is a concentric shaft 16 to which is attached the casting 17, shown in Fig. II, in which are mounted the inner paddles 18. The lower end of said paddles are mounted in a casting 19, shown in Fig. I, which revolves freely around the center hollow shaft 20, which is a part of the cylinder 1. An outer set of paddles 21 (Fig. I) are mounted in casting 22 and also in casting 23. Casting 22 is propelled by means of a washer 24 (Fig. VIII). This washer is keyed to shaft 8 (Fig. I) which is milled flat on one part of its circumference so that said shaft will fit the hole provided in washer 24. A square key 25 is provided as a part of washer 24 which is inserted in casting 22 in order to drive the paddles 21 which scrape the inner surface of cylinder 1.

To casting 23 (Fig. I) is attached a gear 26 which meshes with gear 27 to which is attached the worm shaped member 28 (Fig. I) which revolves in housing 29 (Fig. I). Around housing 29 are attached tubes 30, which are a part of the cooling system and which cool the food product which is dispensed from housing 29. Slots or holes 31 (Fig. III) are cut in worm shaped member 28 so as to relieve the pressure on the dispensing valve (Fig. V) when said valve is closed. Referring to Fig. II, two housings 33 and 34 are provided into which are inserted two thermostat bulbs 35 and 36, which control and are a part of thermostat switches 37 and 38.

Referring to Fig X; thermostat switches 37 and 38 are controlled by switches 39 and 40. In operation, thermostat 37 is set for a suitable freezing temperature and switch 39 is closed and the compressor motor 41 is placed in operation. When the freezing operation is completed switch 39 is opened. Thermostat 38 functions to keep the frozen product at a suitable temperature so that said product can be readily dispensed. Switch 40 is normally kept in a closed position.

To the front face of housing 28 is attached the valve housing 42 (Fig. VII) by means of threaded studs and knurled nuts (not shown). Said studs extending through two holes 43, (Fig. VII). Referring to the assembly shown in Fig. V, the movable member of said valve 44 is tapered to fit in the housing 42. One end of member 44 is formed into the shape of a handle while a stud is formed at the other end of said member, said stud being threaded. A pin 45 is forced into movable member 44 and a washer 46 (Fig. VI) acts as a stop for the movable member 44. This is accomplished by placing washer 46 on the threaded stud of movable member 44 as shown. Washer 46 revolves with the handle of the movable member 44 since pin 45 is inserted in a hole 52 provided in said washer. Stud 47 (Fig. VII) acts as a stop at the open and closed position of said valve due to the cam like shape of washer 46. A knurled nut 48 holds the entire assembly in combination.

At the end of the worm shaped member 28 is provided a shaft 49 which revolves in a hole 53 (Fig. IX) provided in valve housing 42. Attention is called to the open position of the valve as shown by Fig. IV. A free passage for the emulsion is provided through the opening 32. The milled slot in the movable member 44 is of such shape that as said valve is closed there is a positive and effective stoppage of the flow of the emulsion as if cut off by a knife or some other sharp object.

The entire freezing and dispensing chambers are properly insulated as shown by 50 (Fig. I), space for said insulation being provided by means of an outer casing 51 (Fig. I).

Having thus described my invention, what I claim is:

1. An apparatus for freezing and cooling food products having in combination a freezing cylinder with refrigerating coils wound around the outside of said cylinder, means for controlling the temperature within said cylinder, a secondary cylinder mounted below the freezing cylinder with an opening between said cylinders to permit the frozen food product to pass from one cylinder to the other, a dispensing valve mounted at the end of said secondary cylinder, a worm shaped member mounted so as to revolve in said secondary cylinder, holes cut in said member to permit enough free motion of the food product in said secondary cylinder so the entire movable mechanism will not jam when said dispensing valve is in the closed position.

2. An apparatus for freezing and cooling food products, having in combination with a a freezing cylinder, a dispensing chamber mounted below said freezing cylinder and interconnected therewith, means within said chamber to convey said food product from said chamber, said means consisting of a screw shaped member rotating within said dispensing chamber, holes cut in the surface of said screw shaped member to permit the free motion of the food product within said dispensing chamber when said food product is not being dispensed.

3. In an apparatus for freezing and cooling food products, the combination of a freezing cylinder, means surrounding said cylinder and acting through the wall of said cylinder to change the temperature of a food product within said cylinder, a dispensing chamber mounted at the bottom of said cylinder and interconnected therewith whereby said product flows into said dispensing chamber, a dispensing valve mounted at the end of said dispensing chamber, a worm shaped member mounted in said chamber and fitting the wall of said chamber said member rotating within said chamber, holes cut in said member to permit certain free motion of said food product within said chamber when said dispensing valve is in the closed position with the screw shaped member in motion.

4. An apparatus for freezing and cooling food products having in combination a freezing cylinder, means for refrigerating the walls of said cylinder, said means consisting of refrigerating coils wound around said cylinder, two thermostats, both having elements resting against the circular exterior of said freezing cylinder whereby each element is acted upon by the temperature of the food product in said freezing cylinder so that one thermostat controls the freezing temperature of said cylinder and the other controls the dispensing temperature of said freezing cylinder, a dispensing chamber mounted below said freezer cylinder and being interconnected therewith, means within said dispensing chamber to convey the food product from said chamber, said means consisting of a screw shaped member rotating within said chamber, holes cut in the surface of the screw shaped member to permit the free motion of the food product within said dispensing chamber when said food product is not being dispensed.

ALOYSIUS J. WYEN.